(12) United States Patent
Chao et al.

(10) Patent No.: US 7,724,738 B2
(45) Date of Patent: May 25, 2010

(54) PACKET-LEVEL MULTICASTING

(76) Inventors: Hung-Hsiang Jonathan Chao, 3 Luccarelli Dr., Holmdel, NJ (US) 07733; Jinsoo Park, 295 Highland St., Leonia, NJ (US) 07605

( * ) Notice: Subject to any disclaimer, the term of this patent is extended or adjusted under 35 U.S.C. 154(b) by 753 days.

(21) Appl. No.: 10/872,187

(22) Filed: Jun. 18, 2004

(65) Prior Publication Data

US 2005/0025171 A1    Feb. 3, 2005

Related U.S. Application Data

(60) Provisional application No. 60/479,733, filed on Jun. 19, 2003.

(51) Int. Cl.
*H04L 12/56* (2006.01)
(52) U.S. Cl. .................... 370/390; 370/432
(58) Field of Classification Search .......... 370/388, 370/390, 432, 417, 392, 393, 395.1, 396, 370/397, 398, 399, 389
See application file for complete search history.

(56) References Cited

U.S. PATENT DOCUMENTS

| | | | | |
|---|---|---|---|---|
| 5,179,556 | A * | 1/1993 | Turner | 370/233 |
| 5,600,795 | A * | 2/1997 | Du | 709/227 |
| 5,686,506 | A | 11/1997 | Chiussi et al. | 370/388 |
| 5,689,506 | A * | 11/1997 | Chiussi et al. | 370/388 |
| 5,864,539 | A | 1/1999 | Yin | 370/236 |
| 6,072,772 | A | 6/2000 | Charny et al. | 370/229 |
| 6,310,879 | B2 | 10/2001 | Zhou et al. | |
| 6,333,932 | B1 * | 12/2001 | Kobayasi et al. | 370/389 |
| 6,396,815 | B1 * | 5/2002 | Greaves et al. | 370/256 |
| 6,426,957 | B1 * | 7/2002 | Hauser et al. | 370/413 |
| 6,449,275 | B1 * | 9/2002 | Andersson et al. | 370/395.31 |
| 6,463,485 | B1 | 10/2002 | Chui et al. | |
| 6,504,820 | B1 | 1/2003 | Oliva | 370/232 |
| 6,621,824 | B1 | 9/2003 | Lauffenburger et al. | 370/412 |
| 6,628,657 | B1 * | 9/2003 | Manchester et al. | 370/395.1 |
| 6,631,130 | B1 * | 10/2003 | Roy et al. | 370/352 |
| 6,819,675 | B2 | 11/2004 | Benayoun et al. | |
| 6,870,831 | B2 | 3/2005 | Hughes et al. | 370/352 |
| 6,920,156 | B1 * | 7/2005 | Manchester et al. | 370/522 |
| 6,954,428 | B2 | 10/2005 | Gotoh et al. | |
| 6,973,092 | B1 | 12/2005 | Zhou et al. | 370/412 |
| 7,016,365 | B1 | 3/2006 | Grow et al. | |
| 7,042,842 | B2 * | 5/2006 | Paul et al. | 370/229 |
| 7,050,448 | B2 | 5/2006 | Johnson et al. | |
| 7,068,654 | B1 | 6/2006 | Joseph et al. | |
| 7,068,672 | B1 | 6/2006 | Jones | 370/412 |
| 7,126,918 | B2 | 10/2006 | Robert | |

(Continued)

OTHER PUBLICATIONS

Cooperatve Association for Internet Data Analysis, www.CAIDA.org, downloaded 2008, 1 page.

(Continued)

*Primary Examiner*—Chi H. Pham
*Assistant Examiner*—Kevin Mew
(74) *Attorney, Agent, or Firm*—Woodcock Washburn LLP

(57) ABSTRACT

Packet-level multicasting may be used to avoid the cell header and the memory size problems. One or more multicast control cells may be appended before one or more data cells of a multicast packet to carry multicast bitmap information. The control cell may be stored at the cell memory. This approach is suitable for a multi-plane, multi-stage packet switch.

37 Claims, 5 Drawing Sheets

U.S. PATENT DOCUMENTS

| | | | |
|---|---|---|---|
| 7,136,356 B2 * | 11/2006 | Suzuki et al. | 370/235 |
| 7,142,553 B1 | 11/2006 | Ojard et al. | 370/421 |
| 7,145,873 B2 | 12/2006 | Luijten et al. | |
| 7,145,914 B2 * | 12/2006 | Olarig et al. | 370/413 |
| 7,154,885 B2 | 12/2006 | Nong | 370/380 |
| 7,180,857 B2 | 2/2007 | Kawakami et al. | |
| 7,366,165 B2 | 4/2008 | Kawarai et al. | |
| 7,453,801 B2 | 11/2008 | Taneja et al. | |
| 7,464,180 B1 | 12/2008 | Jacobs et al. | |
| 7,486,678 B1 | 2/2009 | Devanagondi et al. | |
| 7,545,801 B2 * | 6/2009 | Miller et al. | 370/352 |
| 2002/0054567 A1 | 5/2002 | Fan | 370/230 |
| 2002/0085578 A1 | 7/2002 | Dell et al. | 370/422 |
| 2002/0099900 A1 | 7/2002 | Kawarai et al. | 710/317 |
| 2002/0131412 A1 | 9/2002 | Shah et al. | |
| 2002/0191588 A1 | 12/2002 | Personick | 370/352 |
| 2003/0099194 A1 | 5/2003 | Lee et al. | 370/229 |
| 2003/0118052 A1 | 6/2003 | Kuhl et al. | 370/474 |
| 2003/0123468 A1 | 7/2003 | Nong | 370/412 |
| 2003/0126297 A1 * | 7/2003 | Olarig et al. | 709/250 |
| 2003/0179774 A1 | 9/2003 | Saidi et al. | 370/468 |
| 2003/0218980 A1 * | 11/2003 | Fukushima et al. | 370/230 |
| 2003/0223424 A1 | 12/2003 | Anderson et al. | 370/392 |
| 2003/0227906 A1 | 12/2003 | Hallman | |
| 2004/0037313 A1 | 2/2004 | Gulati et al. | 370/465 |
| 2004/0213156 A1 | 10/2004 | Smallwood et al. | |
| 2005/0002334 A1 | 1/2005 | Chao | |
| 2005/0002410 A1 | 1/2005 | Chao | 370/412 |
| 2005/0025141 A1 | 2/2005 | Chao | 370/412 |
| 2005/0025171 A1 | 2/2005 | Chao | 370/432 |
| 2005/0201314 A1 * | 9/2005 | Hirano | 370/315 |
| 2006/0203725 A1 * | 9/2006 | Paul et al. | 370/229 |
| 2006/0221958 A1 * | 10/2006 | Wijnands et al. | 370/389 |
| 2006/0239259 A1 | 10/2006 | Norman et al. | |
| 2006/0274748 A1 * | 12/2006 | Nakashima et al. | 370/389 |
| 2008/0069125 A1 * | 3/2008 | Reed et al. | 370/410 |
| 2008/0080500 A1 * | 4/2008 | Shimura et al. | 370/389 |
| 2009/0028152 A1 | 1/2009 | Shimonishi | |

OTHER PUBLICATIONS

United States Patent and Trademark Office: Non-Final Office Action dated Jul. 16, 2007, U.S. Appl. No. 10/776,575, 8 pages.

United States Patent and Trademark Office: Non-Final Office Action dated Aug. 8, 2007, U.S. Appl. No. 10/776,574, 5 pages.

United States Patent and Trademark Office: Non-Final Office Action dated Jan. 22, 2008, U.S. Appl. No. 10/776,574, 5 pages.

United States Patent and Trademark Office: Non-Final Office Action dated Sep. 18, 2007, U.S. Appl. No. 10/872,332.

United States Patent and Trademark Office: Non-Final Office Action dated Feb. 13, 2008, U.S. Appl. No. 10/872,332.

United States Patent and Trademark Office: Notice of Allowance dated Mar. 14, 2008, U.S. Appl. No. 10/776,575.

United States Patent and Trademark Office: Non-Final Office Action dated Jul. 25, 2008, U.S. Appl. No. 10/776,574.

United States Patent and Trademark Office: Final Office Action dated Oct. 23, 2008, U.S. Appl. No. 10/872,332.

United States Patent and Trademark Office: Non-Final Office Action dated Feb. 17, 2009, U.S. Appl. No. 10/776,574.

United States Patent and Trademark Office: Non-Final Office Action dated Apr. 1, 2009, U.S. Appl. No. 10/872,332.

United States Patent and Trademark Office: Notice of Allowance dated Jun. 16, 2009, U.S. Appl. No. 10/776,575.

United States Patent and Trademark Office: Notice of Allowance dated Oct. 8, 2009, U.S. Appl. No. 10/776,574.

United States Patent and Trademark Office: Non-Final Office Action dated Oct. 8, 2009, U.S. Appl. No. 10/776,575.

United States Patent and Trademark Office: Notice of Allowance dated Nov. 16, 2009, U.S. Appl. No. 10/872,332.

* cited by examiner

PACKET-LEVEL MULTICASTING

§0.1 RELATED APPLICATIONS

This application claims benefit to U.S. Provisional Application Ser. No. 60/479,733, titled "A HIGHLY SCALABLE MULTI-PLANE MULTI-STAGE BUFFERED PACKET SWITCH," filed on Jun. 19, 2003, and listing H. Jonathan Chao and Jinsoo Park as inventors (referred to as "the '733 provisional"). That application is incorporated herein by reference. The scope of the present invention is not limited to any requirements of the specific embodiments described in that application.

§0.2 FEDERAL FUNDING

This invention was made with Government support and the Government may have certain rights in the invention as provided for by grant number ANI-9906673 by the National Science Foundation.

§1. BACKGROUND OF THE INVENTION

§1.1 Field of the Invention

The present invention concerns communications. In particular, the present invention concerns large scale switches used in communications networks.

§1.2 Background Information

To keep pace with Internet traffic growth, researchers continually explore transmission and switching technologies. For instance, it has been demonstrated that hundreds of signals can be multiplexed onto a single fiber with a total transmission capacity of over 3 Tbps and an optical cross-connect system (OXC) can have a total switching capacity of over 2 Pbps. However, today's core Internet Protocol (IP) routers' capacity remains at a few hundred Gbps, or a couple Tbps in the near future.

It still remains a challenge to build a very large IP router with a capacity of tens Tbps or more. The complexity and cost of building such a large-capacity router is much higher than building an OXC. This is because packet switching may require processing (e.g., classification and table lookup), storing, and scheduling packets, and performing buffer management. As the line rate increases, the processing and scheduling time available for each packet is proportionally reduced. Also, as the router capacity increases, the time for resolving output contention becomes more constrained.

Demands on memory and interconnection technologies are especially high when building a large-capacity packet switch. Memory technology very often becomes a bottleneck of a packet switch system. Interconnection technology significantly affects a system's power consumption and cost. As a result, designing a good switch architecture that is both scalable, to handle a very large capacity, and cost-effective remains a challenge.

The numbers of switch elements and interconnections are often critical to the scalability and cost of a switch fabric. Since the number of switch elements of single-stage switch fabrics is proportional to the square of the number of switch ports, single-stage switch fabric architectures are not attractive for large switches. On the other hand, multi-stage switch architectures, such as a Clos network for example, are more scalable and require fewer switch elements and interconnections, and are therefore more cost-effective.

FIG. 1 shows a core router (CR) architecture 100 which includes line cards 110,120 a switch fabric 130, and a route controller (not shown) for executing routing protocols, maintenance, etc. The router 100 has up to N ports and each port has one line card. (Note though that some switches have ports that multiplex traffic from multiple input line cards at the ingress and de-multiplex the traffic from the switch fabric to multiple line cards at the egress.) A switch fabric 130 usually includes multiple switch planes 140 (e.g., up to p) to accommodate high-speed ports.

A line card 110,120 usually includes ingress and/or egress functions and may include one or more of a transponder (TP) 112,122, a framer (FR) 114,124, a network processor (NP) 116,126, and a traffic manager (TM) 118,128. A TP 112,122 may be used, for example, to perform optical-to-electrical signal conversion and serial-to-parallel conversion at the ingress side. At the egress side, it 112,122 may be used, for example, to perform parallel-to-serial conversion and electrical-to-optical signal conversion. An FR 114,124 may be used, for example, to perform synchronization, frame overhead processing, and cell or packet delineation. An NP 116,126 may be used, for example, to perform forwarding table lookup and packet classification. Finally, a TM 118,128 may be used, for example, to store packets and perform buffer management, packet scheduling, and any other functions performed by the router architecture (e.g., distribution of cells or packets in a switching fabric with multiple planes).

Switch fabric 130 may be used to deliver packets from an input port to a single output port for unicast traffic, and to multiple output ports for multicast traffic.

When a packet arrives at CR 100, it 100 determines an outgoing line to which the packet is to be transmitted. Variable length packets may be segmented into fixed-length data units, called "cells" without loss of generality, when entering CR 100. The cells may be reassembled into packets before they leave CR 100. Packet segmentation and reassembly is usually performed by NP 116,126 and/or TM 118,128.

FIG. 2 illustrates a multi-plane multi-stage packet switch architecture 200. The switch fabric 230 may include p switch planes 240. In this exemplary architecture 200, each plane 240 is a three-stage Benes network. Modules in the first, second, and third stages are denoted as Input Module (IM) 242, Center Module (CM) 244, and Output Module (OM) 246. IM 242, CM 244, and OM 246 often have many common features and may be referred to generally as a Switch Module (SM).

Traffic enters the switch 200 via an ingress traffic manager (TMI) 210 and leaves the switch 200 via an egress traffic manager (TME) 220. The TMI 210 and TME 220 can be integrated on a single chip. Therefore, the number of TM chips may be the same as the number of ports (denoted as N) in the system 200. Cells passing through the switch 200 via different paths may experience different queuing delays. However, if packets belonging to the same flow traverse the switch via the same path (i.e., the same switch plane and the same CM) until they have all left the switch fabric, there should be no cell out-of-sequence problem. FIG. 2 illustrates multiple paths between TMI(0) 210a and TME(0) 220a. The TMI 210 may determine the path ID (PID) of each flow using its flow ID (FID). The PID may correspond to a switch fabric plane 240 number and a CM 244 number in the plane 240.

In the embodiment 200 illustrated in FIG. 2, the first stage of a switch plane 240 includes k IMs 242, each of which has n inputs and m outputs. The second stage includes m CMs 244, each of which has k inputs and k outputs. The third stage includes k OMs 246, each of which has m inputs and n outputs. If n, m, and k are equal to each other, the three modules 242,244,246 may have identical structures.

From the TMI 210 to the TME 220, a cell traverses four internal links: (i) a first link from a TMI 210 to an IM 242; (ii)

a second link from the IM 242 to a CM 244; (iii) a third link from the CM 244 to an OM 246; and (iv) a fourth link from the OM 246 to a TME 220.

In such a switch 200, as well as other switches, a number of issues may need to be considered. Such issues may include supporting multicast. Section 1.2.1 introduces the need for multicasting.

§1.2.1 Cell and Flow Level Multicasting

Multicasting may involve sending a packet from one point (or multiple points) to multiple points. In the context of a switch or router, multicasting may involve sending a packet or cell from one input port to multiple output ports.

Traditionally a multicast function has been implemented using a multicast bitmap in the cell header (i.e., at the cell level) or using a multicast table in the switch fabric (i.e., at the flow level). However, these two approaches do not work well in some large systems as explained below.

Implementing multicasting at the cell level doesn't work well in some large systems because the required bitmap size may be too big to carry in the cell header. For example, if the number of ports is 4096 and multicasting is performed in two stages, the bitmap size should be 128 bits (64 bits in each stage). For example, in a 40-Tb/s system such as that described in the '733 provisional, the required bitmap size would be 128 bits in the cell header (64 bits for the CM and 64 bits for the OM), which is larger than the 96-bit cell header.

The flow level approach doesn't work well with some large systems because the required multicast table size is too large to implement using (year 2003) state-of-the-art VLSI technology because the number of flows the multicast table should maintain requires too much memory space to be practical. For example, if the number of ports is 4096 and each port maintains up to 100 multicast flows, and the number of CMs is 64, the number of flows going through an OM can be 26,214,400 (=64×4096×100) and the required memory size for the multicast table is 1.6 Gbit. More generally, since each OM receives a packet from any TMI through any CM in the same plane, the number of flows is 4096*64*X, where X is the number of multicast flows from one TMI to the OM through the CM. Even if it is assumed that X is equal to 1, each OM should support 256 k multicast flows, leading to 16-Mbit memory size, which is too challenging with current (year 2003) technology.

In view of the foregoing, a new multicasting approach suitable for the multi-plane multi-stage switch architecture would be useful.

§2. SUMMARY OF THE INVENTION

Embodiments consistent with the present invention use packet level multicasting, thus avoiding the cell header and the memory size problems introduced above. In at least some embodiments consistent with the present invention, one or more multicast control cells are appended before one or more data cells of a multicast packet to carry multicast bitmap information. Typically, the number of bits in the multicast bitmap should be the same as the number of all possible destination output ports. In such cases, each bit of the multicast bitmap indicates whether or not the multicast packet is destined for the corresponding output port. The control cell may be stored at the cell memory. This approach is suitable for a multi-plane, multi-stage packet switch.

§3. BRIEF DESCRIPTION OF THE DRAWINGS

§4. DETAILED DESCRIPTION

Figure 1:
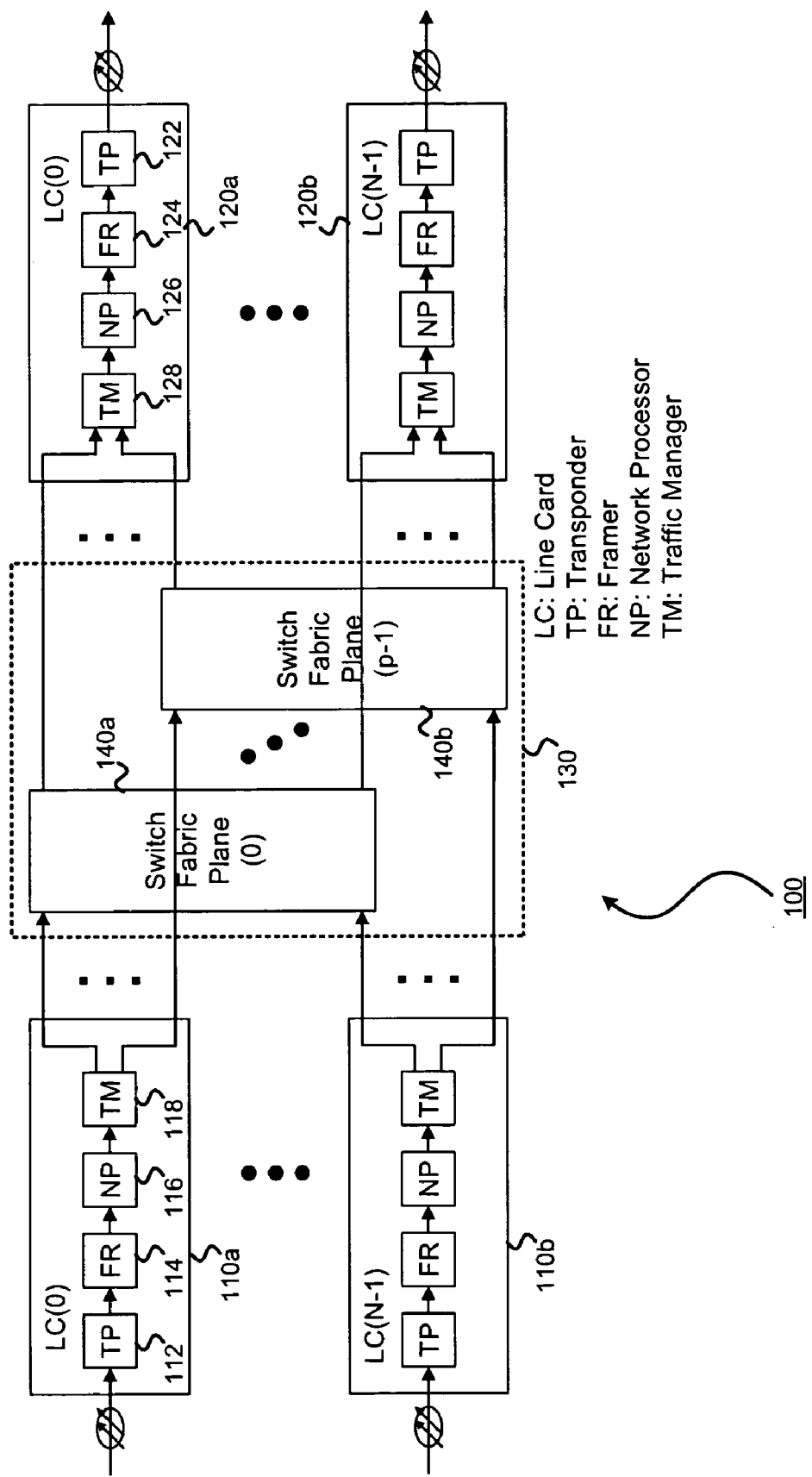
FIG. 1 is a block diagram of an exemplary switch environment in which, or with which, the present invention may be used.

The present invention may involve novel methods, apparatus, message formats, and/or data structures for supporting packet multicasting. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

The following list includes letter symbols that may be used in this application.

N: switch size, which is number of ports in the system (N=n*k)
M: buffer size
R: number of reassembly queues in each TME
n: module size, which is the number of inputs at the IM or the number of outputs at the OM
m: number of CMs
k: number of IMs/OMs
p: number of planes
q: number of priorities
u: hot spot probability
v: heavy flow probability
l: average packet size in cells
d1: distance between the TM and IM/OM in units of cell slot
d2: distance between the IM/OM and CM in units of cell slot
f1: number of normal flows (e.g., 100,000)
f2: number of heavy flows (e.g., 10)
Q_sm: Queue size in SM (e.g., 15)
B_sm: Buffer size in SM (e.g., 32)
Q_voq: VOQ size in TMI (e.g., 1023 cells)
Q_raq: RAQ size in TME (e.g., 255 cells)
B_tmi: Buffer size in TMI (e.g., 2 million cells)
B_tme: Buffer size in TME (e.g., 2 million cells)

The following list includes acronyms that may be used in this application.
AP: Acknowledgement Period
ASIC: Application Specific Integrated Circuit
ATM: Asynchronous Transfer Mode
BOC: Buffer Outstanding Cell counter
BOP: Beginning Of Packet cell
BRC: Buffer Reserved Cell counter
CAM: Content Addressable Memory
CI: Cell Interleaving
CM: Center Module
COP: Continue Of Packet
CPI: Complete Packet Interleaving
COSQ: Class Of Service Queue
CR: Core Router
CRC: Cyclic Redundancy Check
CRT: CRediT update
CTYPE: Cell TYPE
DEST: DESTination
DPI: Dynamic Packet Interleaving
DQ: Destination Queue
DQC: DQ Counter
DQF: DQ Flag
EOP: End Of Packet
FGID: Flow Group ID
FID: Flow ID
FIFO: First In First Out queue
FR: FRamer
Gbps: Giga bits per second (i.e., $10^9$ bps)
HEC: Header Error detection and Correction
HOL: Head Of Line
ID: IDentification
IM: Input Module
IP: Internet Protocol
LC: Line Card
LOC: Link Outstanding Cell
Mbits: Mega bits
MHQ: Multicast High-priority Queue
MLQ: Multicast Low-priority Queue
MPLS: Multi-Protocol Label Switching
MRC: Maximum number of Reserved Cells
NP: Network Processor
OM: Output Module
OPC: Outstanding Packet Counter
OXC: Optical Cross-connect System
PACK: Packet ACKnowledgment
Pbps: Peta bits per second (i.e., $10^{15}$ bps)
PID: Path ID
POS: Packet Over SONET
PPI: Partial Packet Interleaving
QOC: Queue Outstanding Cell counter
QRC: Queue Reserved Cell counter
RAQ: ReAssembly Queue
ROC: RTT Outstanding Cell counter
RR: Round Robin
RTT: Round-Trip Time
SCP: Single Cell Packet cell
SM: Switch Module
SQ: Source Queue
Tbps: Tera bits per second (i.e., $10^{12}$ bps)
TM: Traffic Manager module
TMI: Ingress TM
TME: Egress TM
TP: TransPonder
TS: Time Slot
UHQ: Unicast High-priority Queue
ULQ: Unicast Low-priority Queue
VC: Virtual Clock
VOQ: Virtual Output Queue
VPQ: Virtual Path Queue
WFQ: Weighted Fair Queuing
WRED: Weighted Random Early Discard
WRR: Weighted Round Robin Embodiments consistent with the present invention support multicasting in a large system. Multicast bitmap information may be carried in one or more multicast control cells, which are sent before the multicast data cell(s) are sent. In at least some embodiments, each control cell contains up to six 64-bit multicast information bitmaps. In one embodiment, 11 control cells are used to support a broadcast packet.

§4.1 Exemplary Methods

Figure 2:
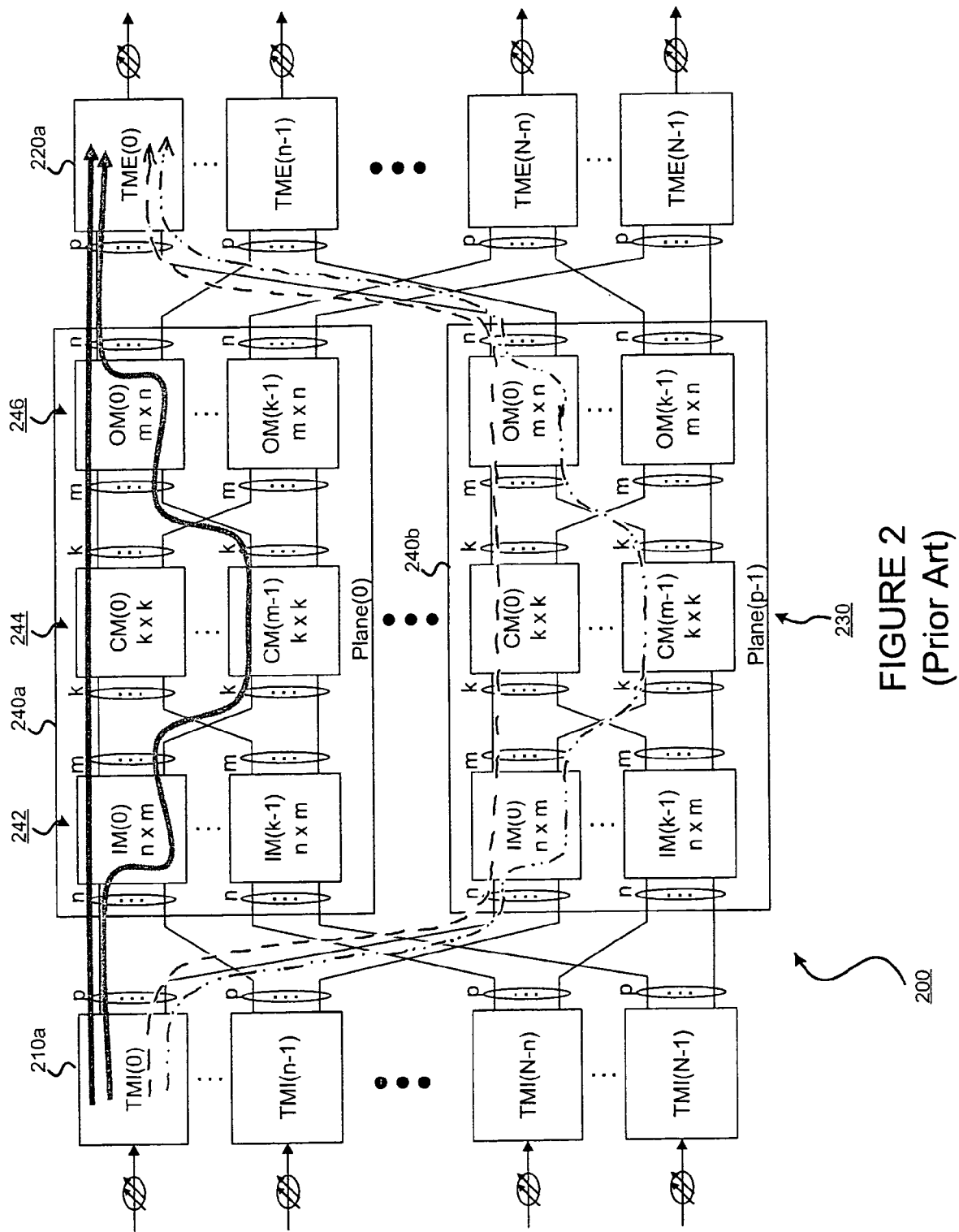
FIG. 2 illustrates alternative paths for a given {input port, output port} pair through a multi-stage switch.
Figure 3:
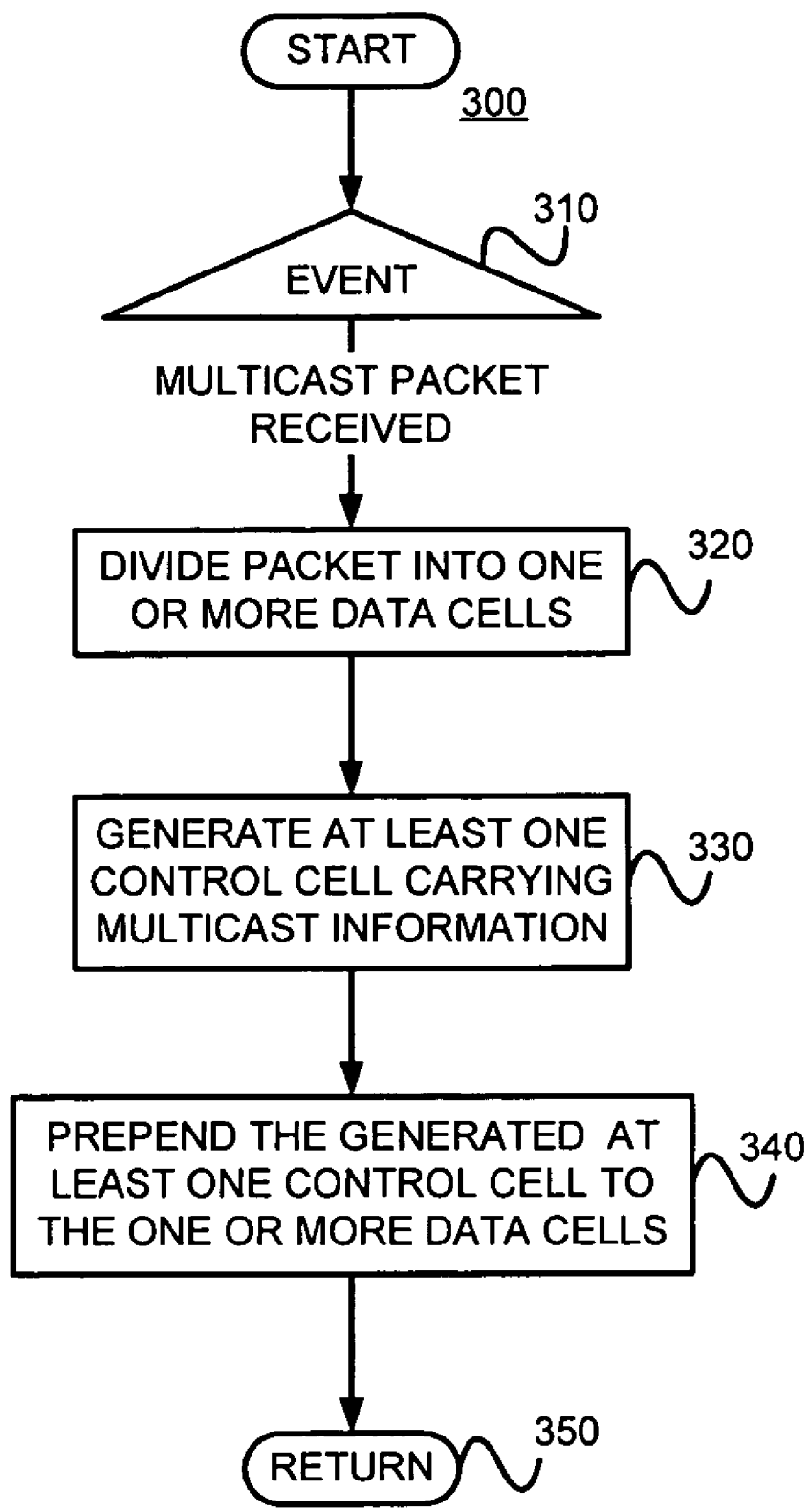
FIG. 3 is a flow diagram of an exemplary method that may be used to perform multicast packet processing.

FIG. 3 is a flow diagram of an exemplary method 300 that may be used to perform multicast packet processing. As indicated, the main acts of the method 300 are performed when a multicast packet is received. (Block 310) More specifically, the packet may be divided into one or more data cells. (Block 320) The first data cell will be of the type COP or EOP. At least one control cell carrying multicast information may be generated. (Block 330) The first control cell will be of the type BOP. Further control cells, if any, will be of the type COP. The one or more generated control cells may then be prepended to the one or more data cells (Block 340) before the method 300 is left (Node 350). Referring back to FIG. 2, the method 300 may be performed at a TMI 210

Figure 4:
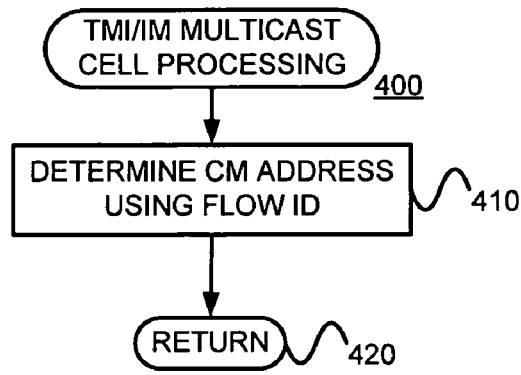
FIG. 4 is a flow diagram of an exemplary method that may be used to process cells of a multicast packet at a TMI or an IM.

FIG. 4 is a flow diagram of an exemplary method 400 that may be used to process cells of a multicast packet at a TMI 210 or an IM 242. As shown, a CM address may be determined using the flow identifier (Block 410) before the method 400 is left (Node 420).

Figure 5:
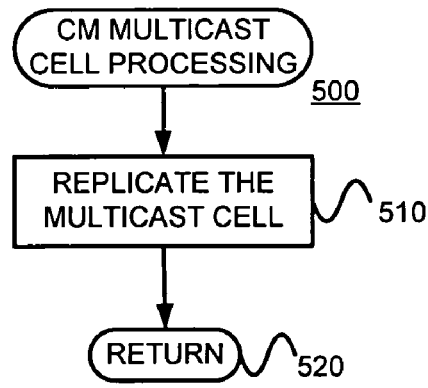
FIG. 5 is a flow diagram of an exemplary method that may be used to process cells of a multicast packet at a CM.

FIG. 5 is a flow diagram of an exemplary method 500 that may be used to process cells of a multicast packet at a CM 244. As shown, the multicast cell may be replicated (Block 510) before the method 500 is left (Node 520). The multicast cell replication may be performed in accordance with a CM bitmap carried in one or more control cells.

Figure 6:
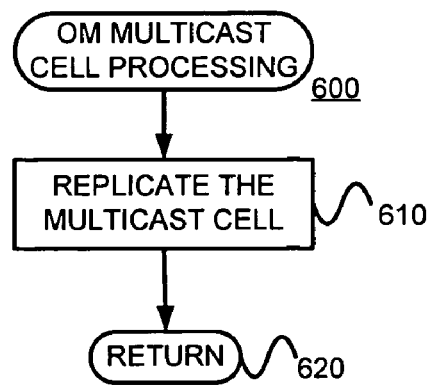
FIG. 6 is a flow diagram of an exemplary method that may be used to process cells of a multicast packet at an OM.

FIG. 6 is a flow diagram of an exemplary method 600 that may be used to process cells of a multicast packet at an OM 246. As shown, the multicast cell may be replicated (Block 610) before the method 600 is left (Node 620). The multicast cell replication may be performed in accordance with an OM bitmap carried in one or more control cells.

§4.2 Exemplary Data Structures

The Table illustrates an exemplary multicast control cell format, consistent with the invention.

TABLE

| | |
|---|---|
| Byte 0-11 | Cell header (96 bits) |
| Byte 12-19 | CM bitmap (64 bits) |
| Byte 20-17 | First set of OM bitmap (64 bits) |
| Byte 28-35 | Second set of OM bitmap (64 bits) |
| Byte 36-43 | Third set of OM bitmap (64 bits) |
| Byte 44-51 | Fourth set of OM bitmap (64 bits) |
| Byte 52-59 | Fifth set of OM bitmap (64 bits) |
| Byte 60-63 | Reserved (32 bits) |

The cell header may include field having a value indicating a cell type (e.g., BOP, COP, or EOP, and control or data).

Figure 7:
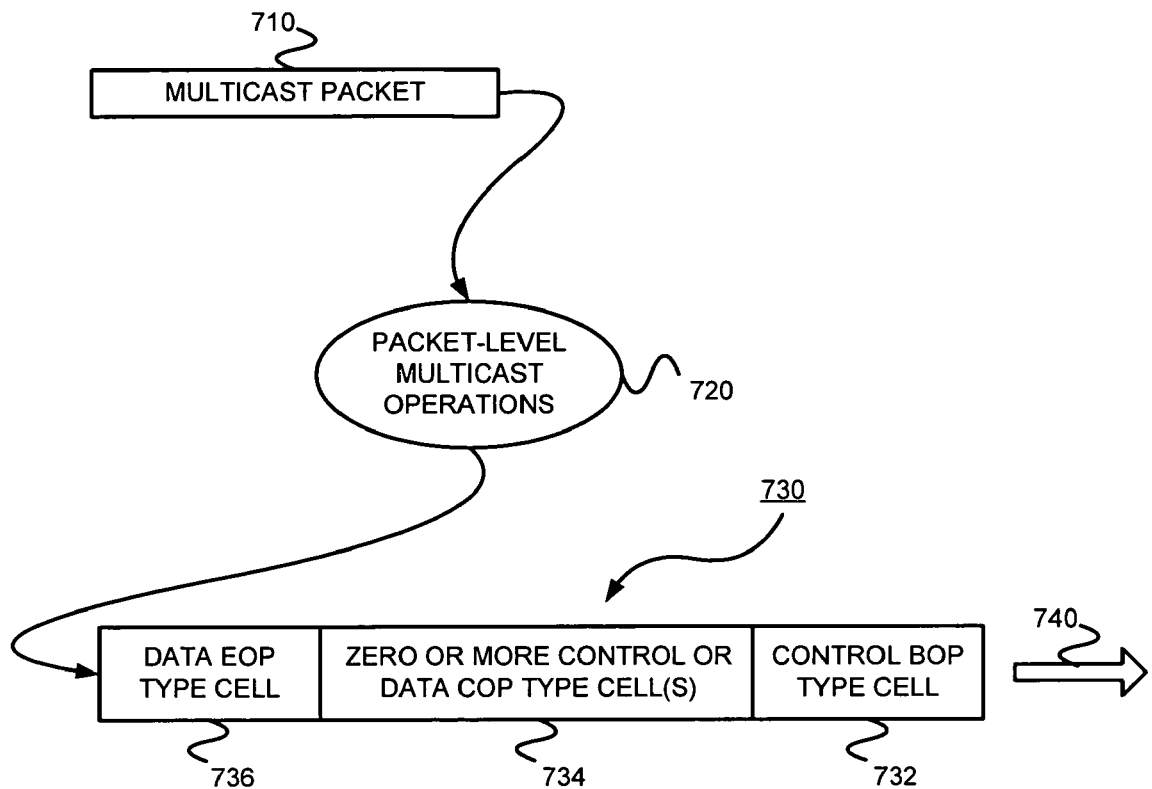
FIG. 7 illustrates an example of operations performed by packet-level multicast operations consistent with the present invention.

§4.3 Example of Operations Performed by Exemplary Packet-Level Multicast Operations FIG. 7 illustrates an example of operations performed by exemplary packet-level multicast operations 720 consistent with the present invention. The operations 720 may be performed by a TMI 210 for example.

When the packet-level multicast operations 720 receive a multicast packet 710, the operations 720 generate one or more control cells (732 and perhaps 734) containing the bitmap information of the multicast packet. The first control cell 732 is indicated as being a beginning-of-packet (BOP) type cell. The following control cells, if any, 734 are indicated as being a continue-of-packet (COP) type cell. The control cell(s) may include information such as that set forth in the TABLE in §4.2 above.

One or more data cells (736 and perhaps 734) follow the control cell(s). The first data cell will be a COP type cell unless it is the last cell of the packet, in which case it will be an end-of-packet (EOP) type cell.

The cell header of a multicast cell may be used to indicate a multicast cell type (control or data) and the length of control cell(s).

As indicated by arrow 740, the cells (collectively referenced as 730) are then forwarded downstream. At a CM 244, the cells 730 may be processed as follows. An ingress processing module (IPM) of the CM may be used to send the CM bitmap information to its scheduler and to store the OM bitmap information in the cell memory. In the CM, the maximum number of fan-out is 4096, which is the case for broadcasting. Therefore, in this case 11 control cells are needed because each control cell can contain up to 6 sets of 64-bit bitmaps. However, in the OM the maximum number of fan-out is 64, so one control cell is enough to contain the 64-bit bitmap.

The multicast cell at the CM competes for port(s) on the OM (e.g., participates in contention) only if the CM bitmap is set for the OM. If the multicast cell wins the contention at the CM arbiter for the OM and the cell type is BOP, it sends the multicast control cell to the OM. The control cell at the OM scheduler has a cell type of BOP.

The multicast cell can be replicated at the TMI, or at the CM and the OM. The required cell space for the multicast cell for each case is compared. If the multicast cell is replicated at the TMI, the required cell space is the product of the fan-out and the packet size. If, on the other hand, the multicast cell is replicated at the CM and the OM, the required cell space at each of the modules (i.e., TMI, IM, CM, and OM) is the sum of the control cells and the data cells. If a broadcast packet of 10 cells is replicated in the TMI, it will occupy 40,960 (=64× 64×10) cell spaces at TMI, IM, CM, and OM. However, if it is replicated in the CM and the OM (Recall, e.g., FIGS. 4-6.), the required cell space is 21 cells (i.e., 11 control cells and 10 data cells) at TMI, IM, and CM. However, all 64 OMs store 11 cells (i.e., 1 control cell and 10 data cells). This is a great reduction in the cell spaces.

In one embodiment consistent with the present invention, the TMI, IM, CM, and OM have one queue dedicated for multicast flows per link per priority. The TMI and IM do not replicate the multicast cell because the CM address is determined by a flow identifier (FID) even for the multicast cell. Once the multicast cell arrives at the CM, it can be sent to multiple OMs according to the CM bitmap information.

§4.4 Conclusions

As can be appreciated from the foregoing, by using packet-level multicasting, cell header and memory size problems are avoided. Thus, packet-level multicasting is suitable for a multi-plane, multi-stage packet switch.

What is claimed is:

1. A method for multicasting a packet, the method comprising:
   accepting, at a communication switch, a packet;
   generating at least one data cell from the packet;
   generating at least one control cell for the packet, the at least one control cell including a cell header and multicast information that is separate from the cell header, wherein the multicast information comprises a bit for each output port in a switch fabric, and wherein the at least one control cell is generated upon acceptance of the packet;
   combining the at least one data cell with the at least one control cell; and
   queuing the combined cells for forwarding.

2. The method of claim 1 wherein the act of combining the at least one data cell with the at least one control cell includes prepending the at least one control cell to the at least one data cell.

3. The method of claim 1 wherein the combined cells are queued for forwarding at an input of a multi-stage switch having a switch fabric including input modules, central modules and output modules.

4. The method of claim 3 wherein the at least one control cell includes a multicast bitmap for the central modules.

5. The method of claim 3 wherein the at least one control cell includes a multicast bitmap for the output modules.

6. The method of claim 3 wherein the at least one control cell includes a first multicast bitmap for the central modules and a second multicast bitmap for the output modules.

7. The method of claim 6 wherein the second multicast bitmap is larger than the first multicast bitmap.

8. The method of claim 3 wherein the at least one control cell includes a first set of multicast information for the central modules and a second set of multicast information for the output modules.

9. The method of claim 3 further comprising:
   accepting at least one of the cells at one of the input modules; and
   determining a central module to which the accepted cell is to be forwarded using flow identifier information.

10. The method of claim 1 wherein a first of the at least one control cell is a beginning-of-packet type cell.

11. The method of claim 10 wherein there are at least two control cells and wherein each of the at least two control cells other than the first control cell is a continue-of-packet type cell.

12. The method of claim 10 wherein a last of the at least one data cell is an end-of-packet type cell.

13. The method of claim 12 wherein there are at least two data cells and wherein each of the at least two data cells other than the last of the at least two control cells is a continue-of-packet type cell.

14. An apparatus for multicasting a packet, the apparatus comprising:
   means for accepting a packet;
   means for generating at least one data cell from the packet;
   means for generating at least one control cell for the packet, the at least one control cell including a cell header and multicast information that is separate from the cell header, wherein the multicast information comprises a bit for each output port in a switch fabric, and wherein the at least one control cell is generated upon acceptance of the packet;
   means for combining the at least one data cell with the at least one control cell; and
   means for queuing the combined cells for forwarding.

15. The apparatus of claim 14 wherein the means for combining the at least one data cell with the at least one control cell prepend the at least one control cell to the at least one data cell.

16. The apparatus of claim 14 further comprising a multi-stage switch having a switch fabric including input modules, central modules and output modules, wherein the queue is provided at an input side of the multi-stage switch.

17. The apparatus of claim 16 wherein the at least one control cell includes a multicast bitmap for the central modules.

18. The apparatus of claim 16 wherein the at least one control cell includes and a multicast bitmap for the output modules.

19. The apparatus of claim 16 wherein the at least one control cell includes a first multicast bitmap for the central modules and a second multicast bitmap for the output modules.

20. The apparatus of claim 19 wherein the second multicast bitmap is larger than the first multicast bitmap.

21. The apparatus of claim 16 wherein the at least one control cell includes a first set of multicast information for the central modules and a second set of multicast information for the output modules.

22. The apparatus of claim 14 wherein a first of the at least one control cell is a beginning-of-packet type cell.

23. The apparatus of claim 22 wherein there are at least two control cells and wherein each of the at least two control cells other than the first control cell is a continue-of-packet type cell.

24. The apparatus of claim 22 wherein a last of the at least one data cell is an end-of-packet type cell.

25. The apparatus of claim 24 wherein there are at least two data cells and wherein each of the at least two data cells other than the last of the at least two control cells is a continue-of-packet type cell.

26. A communication switch for multicasting a packet, the communication switch comprising:
 a traffic manager module configured for:
  accepting a packet,
  generating at least one data cell from the packet,
  generating at least one control cell for the packet, the at least one control cell including a cell header and multicast information that is separate from the cell header, wherein the multicast information comprises a bit for each output port in a switch fabric, and the at least one control cell is generated upon acceptance of the packet, and
  combining the at least one data cell with the at least one control cell; and a central module for queuing the combined cells for forwarding.

27. The communication switch of claim 26 wherein the traffic manager prepends the at least one control cell to the at least one data cell.

28. The communication switch of claim 26 further comprising a multi-stage switch having a switch fabric including input modules, central modules and output modules, wherein the queue is provided at an input side of the multi-stage switch.

29. The communication switch of claim 28 wherein the at least one control cell includes a multicast bitmap for the central modules.

30. The communication switch of claim 28 wherein the at least one control cell includes and a multicast bitmap for the output modules.

31. The communication switch of claim 28 wherein the at least one control cell includes a first multicast bitmap for the central modules and a second multicast bitmap for the output modules.

32. The communication switch of claim 31 wherein the second multicast bitmap is larger than the first multicast bitmap.

33. The communication switch of claim 28 wherein the at least one control cell includes a first set of multicast information for the central modules and a second set of multicast information for the output modules.

34. The communication switch of claim 26 wherein a first of the at least one control cell is a beginning-of-packet type cell.

35. The communication switch of claim 34 wherein there are at least two control cells and wherein each of the at least two control cells other than the first control cell is a continue-of-packet type cell.

36. The communication switch of claim 35 wherein a last of the at least one data cell is an end-of-packet type cell.

37. The communication switch of claim 36 wherein there are at least two data cells and wherein each of the at least two data cells other than the last of the at least two control cells is a continue-of-packet type cell.

* * * * *